W. H. CARTER.
Clay-Cutters.

No. 149,719.                     Patented April 14, 1874.

WITNESSES:
Jas. E. Hutchinson
John R. Young

INVENTOR.
Wallace H. Carter, by
Prindle and Dean, his
Attorneys.

UNITED STATES PATENT OFFICE.

WALLACE H. CARTER, OF WATERVILLE, MAINE.

IMPROVEMENT IN CLAY-CUTTERS.

Specification forming part of Letters Patent No. 149,719, dated April 14, 1874; application filed October 30, 1873.

*To all whom it may concern:*

Be it known that I, WALLACE H. CARTER, of Waterville, in the county of Kennebec and in the State of Maine, have invented certain new and useful Improvements in Clay Cutters or Excavators; and do hereby declare that the following is a full, clear, and exact description thereof, reference being had to the accompanying drawing making a part of this specification, in which—

Figure 1:
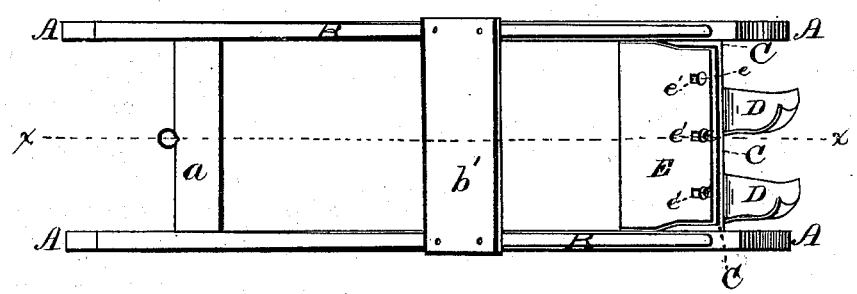
Figure 2:
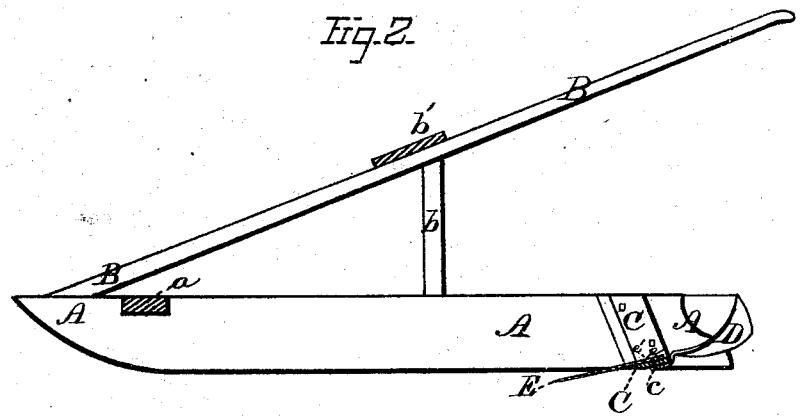

Figure 1 is a plan view of the upper side of my device, and Fig. 2 is a vertical central section of the same on a line extending from front to rear.

Letters of like name and kind refer to like parts in each of the figures.

My invention relates to that class of devices used for breaking up, scraping, or loosening the earth for making bricks, pottery, and the like; and it consists in the use of a detachable knife or flat cutting-piece which can be used on one side, or with one side attached to the frame and then reversed, so as to allow the said knife or cutting-edge to be fastened upon the frame with the opposite side up. It consists, further, in the general detail of constructing and arranging and securing together the cutter, the frame, and the mold-boards, whereby a strong and effective device is made that will operate to the best advantage, and will not easily get out of repair.

In the annexed drawing, A represents the sled; B, the handles, which are attached to the front of the sled and secured to its runners, also by the upright $b$, and to each other by the cross-bar $b'$. The front of the sled is strengthened by the bar $a$, which may also be used as a hitch-bar, to which may be attached the draft-chain or rope. Near the rear end of the runners, and upon the inside faces thereof, I attach the metal frame C, usually by bolts passing through the ends of the frame, where they are bent at right angles, so as to fit against the inside faces of the runners, and through said runners, said bolts being fastened in place by nuts. These ends are not set vertically against the inside faces, but at a slight incline forward, so as to give the bottom face a slope upward from front to rear, for the purpose to be hereafter explained. Thus secured, the frame is easily applied and readily detached, as occasion may demand. To this frame, at its rear, I secure, in any strong and substantial manner, the mold-boards D, which are bent so as to more thoroughly pulverize the earth or clay as it passes away from the device after it has been loosened up by the cutter, whereby it will dry very quickly. To the upper face of the frame C, which has a slight incline or slope upward from front to rear, as above described, I affix the knife or piece of metal with a cutting-edge, E. This is done by means of the headed bolts $e$, which are passed through the slots $e'$ in the knife and the holes $c$ in the frame, and secured by nuts. These bolts have square sides, so that they cannot be turned when the nuts on the under side come in contact with the earth, even if the nuts are turned. The knife has a very sharp edge, beveled on both sides like an ordinary knife-edge for cutting. It is so made that it can be attached, as above described, with either side or face up. The object and advantage of this are to afford a means for keeping said edge constantly sharp, so that when the edge of said knife or piece of metal has become worn or dull, on reversing it in the manner above described, so as to bring the bottom side up, the under edge will be found sharp and effective, and in the operation of the earth or soil or clay upon the said edge, it will be found that so fast as it becomes dulled for use one side up, by simply reversing the knife or piece of metal the other side will be found very sharp.

This has been found a very excellent feature in my device, and one which especially commends my invention in practical use. By adopting this method and means I avoid almost entirely the trouble, so tedious and expensive, of removing the entire frame and sharpening said edge. It also saves in material, because the knife does not have to be ground or filed, the mere friction of the earth serving to sharpen it effectually, and therefore it lasts longer.

By attaching the knife or metal piece in the manner above described, it can be easily moved back or forth and gaged according as the occasion may require, the edge to project more or less below the bottom of the runners.

In illustrating my invention, I have shown how it may be adapted to use on a sled; but it is obvious that a mere wooden frame or any ordinary device used for this purpose could be fashioned to answer the same purpose as the sled, and without the use of any inventive skill.

In practical operation, I have been able to do a much larger per cent. of work with a machine embodying this invention, as above set forth, and without any increase of draft-power.

Having thus fully set forth the nature and merits of my invention, what I claim as new, is—

1. The sled A, frame C, mold-boards D, and reversible cutter E, the several parts being arranged and combined in the manner and for the purpose set forth.

2. The inclined metallic frame C, fitted by its ends to and upon the inside faces of the runners, as described, and combined therewith and with the movable and reversible clay-cutter E, as and for the purpose set forth.

In testimony that I claim the foregoing I have hereunto set my hand this 28th day of October, 1873.

WALLACE H. CARTER.

Witnesses:
EVERETT R. DRUMMOND,
LEVI T. BOOTHBY.